(12) United States Patent
Bennett, III et al.

(10) Patent No.: US 9,515,990 B1
(45) Date of Patent: Dec. 6, 2016

(54) COMMUNICATING REREGISTRATION INFORMATION BASED ON THE LIFETIME OF A COMMUNICATION SESSION

(75) Inventors: John H. Bennett, III, Lawrence, KS (US); Frederick C. Rogers, Olathe, KS (US); Serge M. Manning, Plano, TX (US); C. Brent Hirschman, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 605 days.

(21) Appl. No.: 12/983,523

(22) Filed: Jan. 3, 2011

(51) Int. Cl.
*G06F 15/16* (2006.01)
*H04L 29/06* (2006.01)

(52) U.S. Cl.
CPC ............. *H04L 63/02* (2013.01); *H04L 69/161* (2013.01)

(58) Field of Classification Search
CPC . H01L 63/02; H01L 63/0869; H01L 63/329; H01L 67/306; H01L 69/161; H01L 69/16; H04W 12/06; H04W 80/04; H04W 88/16
See application file for complete search history.

(56) References Cited

U.S. PATENT DOCUMENTS

| | | | |
|---|---|---|---|
| 6,665,718 B1 * | 12/2003 | Chuah et al. | 709/225 |
| 7,152,238 B1 | 12/2006 | Leung et al. | |
| 2002/0147837 A1 | 10/2002 | Heller | |
| 2003/0088676 A1 * | 5/2003 | Smith et al. | 709/227 |
| 2004/0013116 A1 | 1/2004 | Greis et al. | |
| 2004/0176091 A1 * | 9/2004 | Bajko et al. | 455/435.1 |
| 2006/0085548 A1 * | 4/2006 | Maher, III | H04L 29/06027 709/227 |
| 2008/0151784 A1 * | 6/2008 | Abrol et al. | 370/254 |
| 2008/0294891 A1 | 11/2008 | Ram Ov et al. | |
| 2008/0298301 A1 | 12/2008 | Bedekar et al. | |
| 2008/0299969 A1 * | 12/2008 | Shatsky | H04W 60/06 455/435.1 |
| 2009/0109878 A1 | 4/2009 | Liu et al. | |
| 2009/0276532 A1 * | 11/2009 | Bishop | H04L 65/1073 709/228 |
| 2011/0110294 A1 * | 5/2011 | Valluri et al. | 370/328 |

OTHER PUBLICATIONS

RFC 2153, PPP Vendor Extensions, May 1997, all pages.
RFC 3344, IP Mobility Support for IPv4, Aug. 2002, all pages.
RFC 5213, Proxy Mobile IPv6, Aug. 2008, all pages.
RFC 5563, WiMAX Forum/3GPP2 Proxy Mobile IPv4, Feb. 2010, all pages.
D. Johnson, C. Perkins, and J. Arkko. RFC 3775: Mobility Support in IPv6, Jun. 2004, all pages.
Simpson, W. RFC 1661: The point-to-point protocol (PPP) Jul. 1994, all pages.
First Action Interview Pre-Interview Communication mailed Dec. 12, 2012 in U.S. Appl. No. 12/983,517, 4 pp.

(Continued)

*Primary Examiner* — Joseph Greene

(57) ABSTRACT

Methods are described for communicating a reregistration timer to a mobile device. A request is received from a mobile device to establish an IP communication session so that the mobile device is able to communicate by way of a wireless communication network. An allocation component assigns an IP address to the mobile device, in addition to a lifetime value that indicates a length of time after which the IP communication session expires. A threshold value is determined, which is a length of time prior to the expiration of the IP communication session when the session is to be renewed to avoid expiration. Based on the lifetime value and the threshold value, an existing lifetime timer is set and communicated to the mobile device, along with the assigned IP address.

20 Claims, 5 Drawing Sheets

(56) References Cited

OTHER PUBLICATIONS

First Action Interview Office Action mailed Feb. 4, 2013 in U.S. Appl. No. 12/983,517, 5 pp.

Notice of Allowance mailed Mar. 12, 2013 in U.S. Appl. No. 12/983,517, 6 pp.

Notice of Allowance dated May 14, 2015 in U.S. Appl. No. 13/947,597, 8 pages.

* cited by examiner

US 9,515,990 B1

COMMUNICATING REREGISTRATION INFORMATION BASED ON THE LIFETIME OF A COMMUNICATION SESSION

CROSS REFERENCE TO RELATED APPLICATIONS

This application is related by subject matter to the invention disclosed in the following U.S. patent application filed on even date herewith: U.S. application Ser. No. 12/983,517, now U.S. Pat. No. 8,495,186, entitled "MANAGING TERMINATION OF POINT-TO-POINT SESSIONS BETWEEN ELECTRONIC DEVICES," which is assigned or under obligation of assignment to the same entity as this application.

SUMMARY

A high-level overview of various aspects of our technology are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, methods, systems, and computer-readable media for determining a reregistration value and communicating this value, either in the form of an existing inactivity timer or in a newly-created attribute, to the mobile device so that the mobile device is aware of the expiration of the Internet Protocol (IP) communication session. As mentioned, an existing inactivity timer, such as a timer associated with the Network Control Protocol (NCP), may be used to convey the reregistration information to the mobile device. An allocation component, such as a home agent or a local mobility anchor, assigns the mobile device an IP address for establishing the IP communication session and also determines a lifetime value after which the IP communication session expires. Based on the lifetime value and a threshold value, the mobile device is sent the reregistration value so that it is aware when the IP communication session needs to be renewed to prevent its expiration.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

Figure 1:
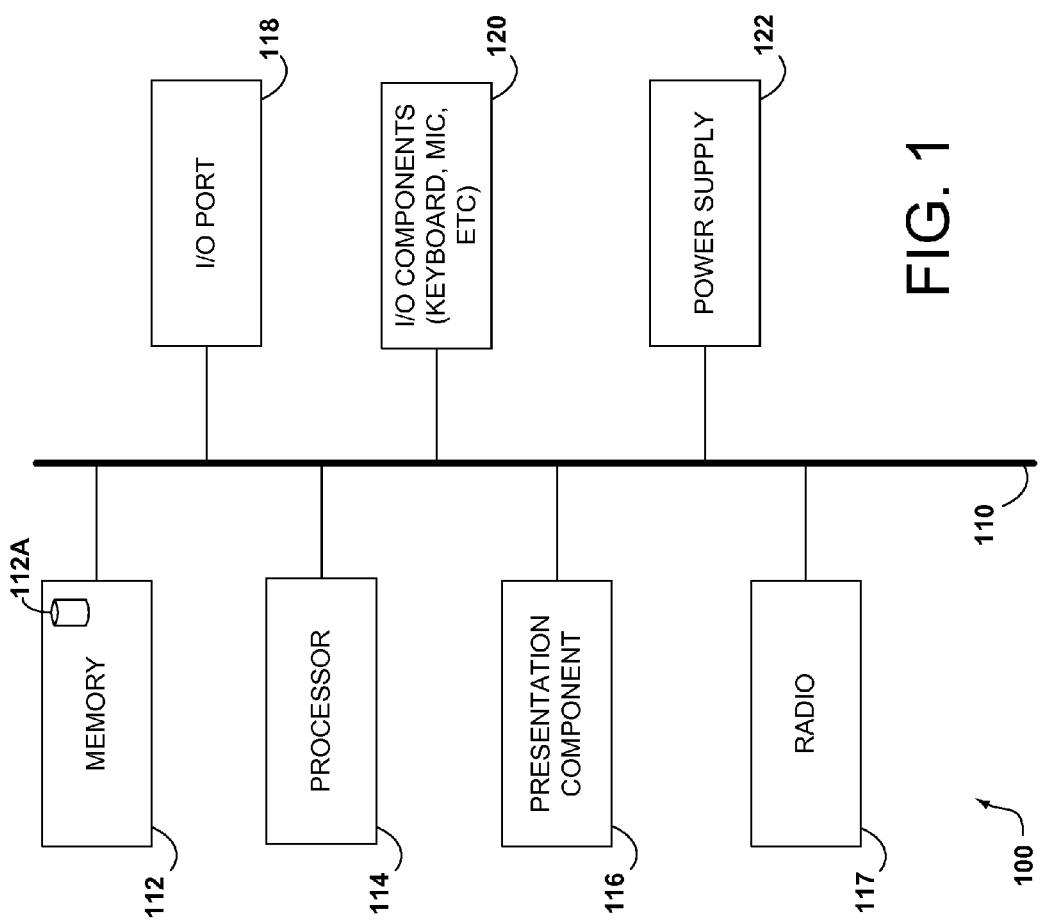
FIG. 1 depicts an illustrative device suitable for use in connection with an embodiment of the present invention.

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AAA Authentication, Authorization, and Accounting
ASN Access Service Network
BTS Base Transceiver Station
CDMA Code Division Multiple Access
DHCP Dynamic Host Configuration Protocol
DNS Domain Name System
eNB E-UTRAN Node B
FA Foreign Agent
GGSN GPRS Gateway Support Node
GPRS General Packet Radio Service
GSM Global System for Mobile communications (Groupe Spécial Mobile)
HA Home Agent
HSS Home Subscriber Server
HTTP Hypertext Transfer Protocol
IP Internet Protocol
IPv4 Internet Protocol Version Four
IPv6 Internet Protocol Version Six
LED Light Emitting Diode
LMA Local Mobility Anchor
MAG Mobile Access Gateway
MIP Mobile IP
MME Mobility Management Entity
PDA Personal Data Assistant
PDSN Packet Data Serving Node
P-GW Packet Data Network Gateway
PPP Point-to-Point Protocol
RNC Radio Network Controller
SGSN Serving GPRS Support Node
S-GW Serving Gateway
TDMA Time Division Multiple Access
UMTS Universal Mobile Telecommunications System Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media include both volatile and non-volatile media, removable and nonremovable media, and contemplate media readable by a database, a switch, and various other network and computing devices. Computer-readable media include media implemented in any method or technology that stores information. Examples of stored information include computer-useable instructions, data structures, program modules, and other data representations.

Examples of computer-readable media include, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

As mentioned, embodiments of the present invention include methods, systems, and computer-readable media for communicating reregistration information to a mobile device regarding the current IP communication session associated with the mobile device. This reregistration information may be communicated to the mobile device either by way of a new attribute in a message, or in an existing inactivity timer. The reregistration value may be calculated using a lifetime value determined by the allocation component and a threshold value. In one embodiment, the reregistration value is equal to or less than the value of the lifetime value less the threshold value. In one instance, the mobile device is able to renew the current IP communication session prior to its expiration if it knows an application will be running on the mobile device and requires an active IP communication session. Without knowing the registration value, the mobile device would not know when to renew the IP communication session.

In one aspect of the present invention, computer-readable media having computer-executable instructions embodied thereon that, when executed, facilitate a method for communicating a reregistration value to a mobile device. The method includes receiving a request for an Internet Protocol (IP) address that is used to establish an IP communication session between a particular mobile device and a wireless communications network. Further, the method includes authenticating the mobile device to the wireless communications network. Authenticating the mobile device includes communicating a message to an allocation component indicating that the mobile device is requesting establishment of the IP communication session, thus indicating that the mobile device does not currently have an assigned IP address, and receiving the assigned IP address for the mobile device and a lifetime value indicating a length of time after which the IP communication session expires. Additionally, the method includes creating a new attribute to communicate to the mobile device and communicating a message to the mobile device. The message includes the assigned IP address and the new attribute that comprises a reregistration value calculated from the lifetime timer. The reregistration value allows the mobile device to reregister the IP communication session when the session has expired or renew the current IP communication session prior to expiration of the session.

In a further aspect of the present invention, computer-readable media having computer-executable instructions embodied thereon that, when executed, facilitate another method for communicating a lifetime timer to a mobile device. The method includes receiving a request from the mobile device to establish an Internet Protocol (IP) communication session, thus allowing the mobile device to communicate with a wireless communications network. The method also includes communicating the request to an allocation component in the form of a binding update and receiving from the allocation component an IP address that has been assigned to the mobile device and a lifetime value indicating a length of time after which the IP communication session associated with the mobile device expires. Further, the method includes determining a threshold value that indicates the length of time prior to expiration of the IP communication session at which reregistration of the IP communication session with the wireless communications network is to occur. The method additionally includes setting a lifetime timer based on the lifetime value and the threshold value and communicating the lifetime timer and the assigned IP address to the mobile device so that the mobile device is aware of an expiration of the IP communication session.

In another aspect of the present invention, computer-readable media having computer-executable instructions embodied thereon that, when executed, facilitate another method for communicating an existing inactivity timer to a mobile device. The method includes authenticating the mobile device on a wireless communications network, thus enabling the mobile device to communicate data with the wireless communications network. The method also includes establishing an Internet Protocol (IP) communication session for the mobile device and utilizing an existing timer to set a lifetime value corresponding to an amount of time after which the IP communication session expires. Further, the method includes communicating the existing timer and the assigned IP address to the mobile device and within a predetermined threshold of time prior to expiration of the IP communication session, receiving an indication from the mobile device to prevent the IP communication session from expiring.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. A mobile device may be one of many devices, including, but not limited to, a mobile phone, a laptop, a PDA, a handheld device, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information (e.g., a datastore 112A). Processor 114 might actually be multiple processors that receive instructions and process them accordingly. Presentation component 116 includes the likes of a display, a speaker, as well as other components that can present information (such as a lamp (LED), or even lighted keyboards).

Radio 117 is a radio that facilitates communication with a wireless telecommunications network. Illustrative wireless telecommunications technologies include CDMA, GPRS, TDMA, GSM, WIMAX, LTE, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
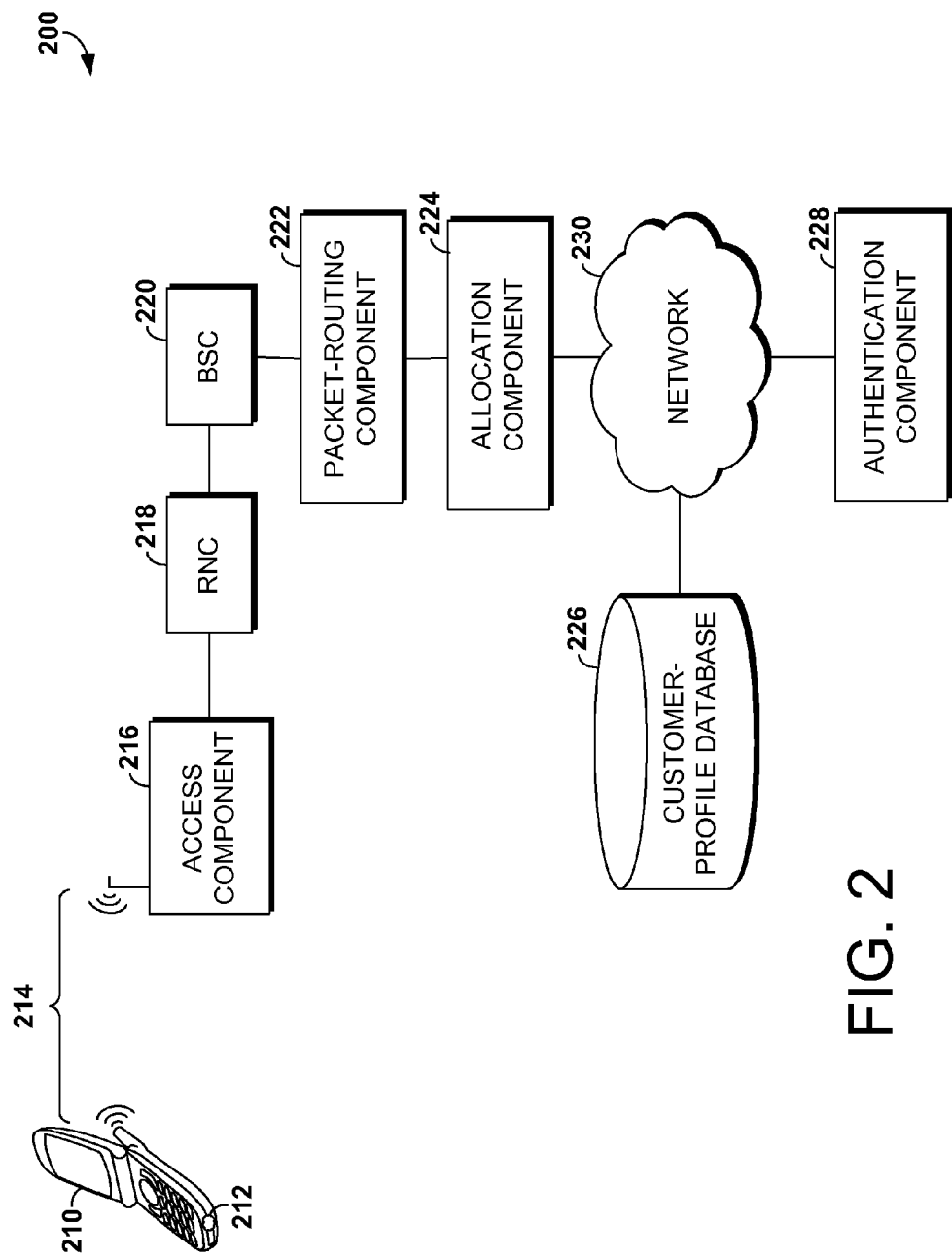
FIG. 2 depicts an illustrative operating system suitable for practicing an embodiment of the present invention.

Turning now to FIG. 2, an illustrative operating environment is provided and referenced generally by the numeral 200, which depicts an illustrative networking environment for communicating a lifetime timer indicating a lifetime value to a mobile device. Mobile device 210 is the type of device described in connection with FIG. 1 in one embodiment. It includes a client application 212 that helps carry out aspects of the technology described herein. Whenever we speak of an application, software, or the like, we are really referring to one or more computer-readable media that are embodied with a set of computer-executable instructions that facilitate various actions to be performed. We will not always include this lengthy terminology because doing so would make this document more difficult to read. In one embodiment, the client application 212 receives a lifetime timer from a packet-routing component, for example, and monitors the lifetime of an existing IP communication session using the timer.

Mobile device 210 communicates with an access component 216 by way of a communications link 214. Communications link 214 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a WiFi connection to a device (e.g., mobile hotspot) that provides access to a wireless communications network, such as a WLAN connection using 802.11 protocol. A long-range connection may include a connection using one or more of CDMA, GPRS, GSM, TDMA, and 802.16.

Generally, the access component 216 provides access to what some skilled artisans refer to as a wireless communications network, also termed a core network. A wireless communications network may comprise one or more of the components illustrated in FIG. 2. To the contrary, not all components that make up a wireless communications network are shown. Also, not all connections or possible connections are shown. The access component 216 may be one or more of a base transceiver station (BTS) tower, a WiFi Router, a Mobile Hotspot, and any other device that facilitates communication between mobile device 210 and network 230. In one embodiment, the access component 216 includes both a WiFi Router and a BTS tower. In another embodiment, access component 216 is a BTS tower. A radio network controller (RNC) 218 performs various functions, such as managing radio channels, power control, load control, admission control, packet scheduling, handover control, macrodiversity, security functions, and mobility management. A base station controller (BSC) 220 is also shown in FIG. 2. The BSC 220 acts as the intelligence behind base transceiver stations (BTS) (not shown), and handles allocation of radio channels, receives measurements from mobile devices, and controls handovers from one BTS to another BTS.

The components illustrated in FIG. 2, such as those that may be included in a wireless communications network include a packet-routing component 222, an allocation component 224, a customer-profile database 226, and an authentication component 228. As mentioned, other components not shown here may also be used to carry out aspects of the present invention. Further, several components shown in FIG. 2 may be combined into a single component although shown separately in FIG. 2. A packet-routing component 222 may be known to those of ordinary skill in the art as a packet data serving node (PDSN), typically used in CDMA networks or a foreign agent (FA). In some instances, the packet-routing component 222 may also encompass some functionality of other components, such as a Local Mobility Anchor (LMA) used for PMIP functions in the PDSN, or a serving GPRS support node (SGSN), typically used in GSM and UMTS networks. Additionally, an Access Service Network (ASN) gateway may be used and is typically used in WiMAX networks. The packet-routing component 222 acts as the serving point between the radio access and IP networks. It is responsible for managing point-to-point protocol (PPP) sessions between the mobile provider's core IP network 230 and the mobile device 210. At a high level, the packet-routing component 222 helps provide access to the Internet as well as to other network technologies and application services. It helps provide mobile IP (MIP) access, one-agent support, and transportation of packets to facilitate the tunneling or communicating of data through virtual private networks. It can act as a client for an authentication server, such as authentication component 228, which helps ensure that mobile device 210 is authorized to communicate via the wireless communications network. In one embodiment, the packet-routing component 222 includes a set of computer-executable instructions that helps carry out various aspects of technology described herein.

The allocation component 224 has various responsibilities, including allocating an IP address to a mobile device (or a portion thereof, such as a network portion), determining a lifetime value after which the IP communication session expires for a particular mobile device, etc. The allocation component 224, in one embodiment, is a home agent (e.g., HA, MAG). In another embodiment, the allocation component 224 is an LMA. Generally, the LMA is a component defined as a network entity for proxy mobile IP (PMIP). The LMA is a router that maintains a collection of host routes and associated forwarding information for mobile nodes within a localized mobility management domain under its control. In many embodiments, the LMA functions as the home agent from a mobile device in a PMIP domain. It is the anchor point for the mobile node's home network prefixes and also manages the mobile device's binding state. Additionally, the LMA supports PMIP protocol. PMIP is a network-based mobility management protocol that accommodates various access technologies, including WiMAX, 3GPP, and WLAN. Using PMIP, the host can change its point-of-attachment to the Internet without changing its IP address. In embodiments, PMIP operates as follows: a mobile device enters a PMIP domain. A MAG on that link checks host authorization so that the mobile device obtains an IP address. A MAG updates an LMA regarding the current location of a host.

In one embodiment, the packet-routing component 222 requests from the allocation component 224 an IP address for a particular mobile device. In addition to providing an assigned IP address, the allocation component 224 also provides the packet-routing component with a lifetime value that is to be used in a timer representing the amount of time that an IP communication session last before the session expires. In one instance, an existing timer, such as a Network Control Protocol (NCP) inactivity timer may be used. In another instance, an existing timer is not used, but a new message or new attribute is defined. In either instance, the reregistration value is communicated to the mobile device such that the mobile device is now aware how long it has until the current session expires. Additionally, applications running on the mobile device may now be aware when the reregistration information is communicated to the mobile device. For example, using current technologies, IP addresses using PMIP rely on IPCP to assign simple IP addresses to the mobile node. The mobile node, however, is unaware that mobile IP is even occurring in the network, in addition to there being no address lifetime field currently available. The existing set of inactivity timers do not reflect the network-based MIP registration lifetime. Today, the network would need to terminate the entire PPP LCP if the MIP address had expired. This uses unnecessary resources in reestablishing IP communication sessions that could have been otherwise renewed prior to its expiration. Embodiments of the present invention allow for components in the network, such as the packet-routing component 222, to set inactivity timer values to reflect the MIP registration lifetime, allowing the network to deregister the IP address when the MIP registration lifetime has expired (e.g., such as in the absence of network activity) or to reregister the IP address if there has been network activity.

In one embodiment, a Long Term Evolution radio network may be used, such that the access component 216 is a EUTRAN Node B. The BSC 220 is a Mobility Management Entity. Further to this embodiment, the packet-routing component 222 is a Serving Gateway, the allocation component 224 is a Packet Data Network Gateway (P-GW), and the authentication component 228 is a Home Subscriber Server (HSS).

The customer-profile database 226 and the authentication component 228 are shown as being outside the boundary of the network 230, but in embodiments of the present invention one or more of these components are actually located within the network 230. The customer-profile database 226 is used to store various attributes associated with mobile devices, such as IP addresses. Generally, an IP address is a numerical label that is assigned to devices in a network that use the Internet Protocol for communication between its attached devices. An IP address serves two functions, including to identify the host and network interface and location addressing. In embodiments of the present invention, an IP version six (IPv6) address is allocated to a mobile device.

The authentication component 228, in one embodiment, is an authentication, authorization, and accounting (AAA) server. An AAA server is generally responsible for authorizing a mobile device to perform a given activity, such as logging onto an application or service, authenticating a mobile device on the network, and providing accounting services, such as tracking the consumption of network resources by mobile devices.

Generally, in this disclosure, when we speak of communicating data or information we are referring to any action that requires mobile device 210 to have an IP address in order to carry out some action. Mobile device 210 might attempt to access items such as the Internet as well as other components that might alone or in combination facilitate things such as television reception, e-mail reception, picture mail, video mail, video conferencing, and the like.

Figure 3:
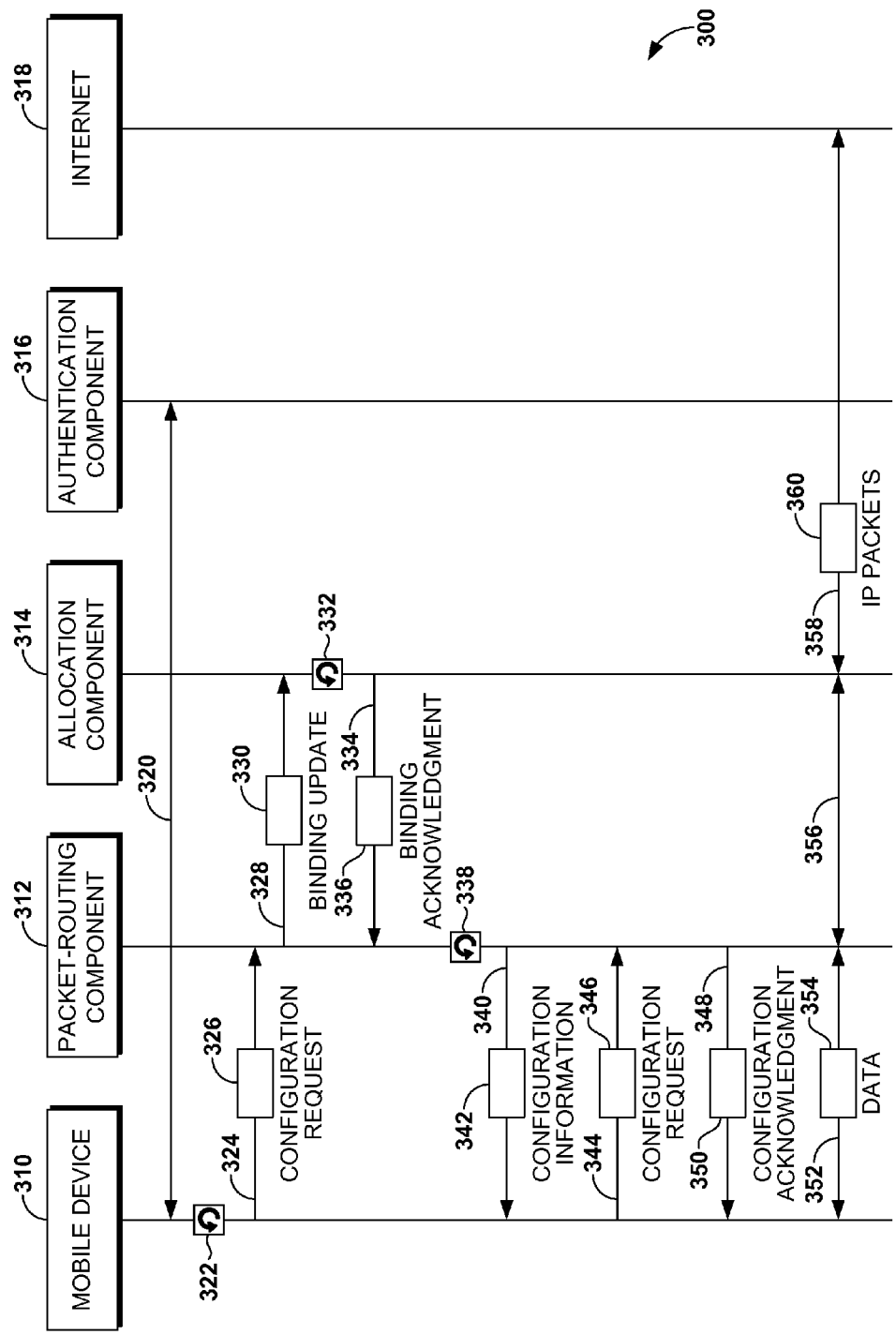
FIG. 3 depicts a flow diagram illustrating a method for communicating an inactivity timer to a mobile device, in accordance with an embodiment of the present invention.

Turning now to FIG. 3, a flow diagram illustrates a method 300 for communicating an inactivity timer to a mobile device, in accordance with an embodiment of the present invention. In the embodiment of FIG. 3, various components are illustrated, including a mobile device 310, a packet-routing component 312, an allocation component 314, an authentication component 316, and the Internet 318. In one embodiment, the packet-routing component 312 is a PDSN or a MAG, as previously described, and the allocation component 314 is an LMA. Initially, a mobile device communicates requests to the network indicating that it would like to establish an IP communication session with the network. Here, this is shown at step 320 where requests, acknowledgments, and other messages are sent back and forth between various network components, including the packet-routing component 312, the allocation component 314, the authentication component 316, etc., and the mobile device 310 to establish an IP communication session. At step 322, the mobile device 310 determines that it would like to request an IP address, such as a simple IP version 4 (IPv4) address.

The mobile device 310 communicates 324 a configuration request 326 to the packet-routing component 312, which forwards 328 this message in the form of a binding update 330 to the allocation component 314. The allocation component 314, as mentioned, performs various functions, including assigning an IP address to a mobile device that is requesting establishment of an IP communication session and determining a quantity of time (e.g., lifetime value after which the IP communication session expires. These responsibilities of the allocation component 314 are represented by step 332. This data, including the IP address and the lifetime value are communicated 334 to the packet-routing component 312 in the form of a binding acknowledgment 336. At step 338, the packet-routing component 312 utilizes the data it has been sent and sets the inactivity timer to reflect the registration lifetime so that the IP address can be deregistered after the timer expires, such as in the absence of network activity, or so the IP address can be reregistered prior to expiration of the timer if there has been network activity. As used herein, a lifetime value represents the registration lifetime of an IP communication session and is the value sent from the allocation component 314 to the packet-routing component 312 that indicates the time after which the IP communication session expires. For instance, if the lifetime value is sixty minutes, the IP communication session lasts for sixty minutes unless the session is renewed prior to its expiration.

In one embodiment, an existing timer is used and communicated to the mobile device. As mentioned above, the packet-routing component 312 receives the lifetime value and uses it to set the inactivity timer at step 338, as mentioned above. Setting the activity timer may include determining a reregistration threshold value. This may be determined by one of the network components, such as the packet-routing component 312 or the allocation component 314. As used herein, the reregistration threshold value, or just threshold value, indicates an amount of time before expiration of the registration lifetime that the packet-routing component 312 may be prompted to send a reregistration request through the network for the IP communication session associated with the mobile device 310 so that the session is not allowed to expire. The packet-routing component 312 then sets the inactivity timer at a value equal to or less than the lifetime value less the reregistration threshold value. For example, if the lifetime value is sixty minutes and the reregistration threshold value is five minutes, the value of the inactivity timer is set at a value equal to or less than fifty-five minutes. How far below fifty-five minutes the inactivity timer is set is implementation specific, but may be one minute, three minutes, etc.

Once the inactivity timer is set, configuration information 342, which includes the inactivity timer, is communicated 340 to the mobile device 310. The inactivity timer may be communicated, by way of point-to-point protocol (PPP), in a packet to the mobile device 310. In one embodiment, the configuration information is sent in a configuration negative acknowledgment (NAK) message. Here, the assigned IP address may be included in the IP address field and the reregistration value may be included in the NCP inactivity timer in the max PPP inactivity timer packet. Various messages may be communicated between the mobile device 310 and the packet-routing component 312, including a configuration request 346 that is communicated 344 to the packet-routing component 312 and a corresponding configuration acknowledgment 350 that is communicated 348 to the mobile device 310. The configuration request 346 may be a request for the packet-routing component 312 to confirm that the IP address that the mobile device 310 received is correct. The configuration acknowledgment 350 may be the confirmation that the IP address is correct. Data 354 may then be transferred 352 between the mobile device 310 and the network. Item 356 represents a tunnel between the packet-routing component 312 and the allocation component 314. Further, IP packets 360 are transferred 358 from the network, such as from the allocation component 314 to the Internet 318, and vice versa.

While not shown in FIG. 3, in one embodiment, a binding update is sent to the allocation component 314 and a binding acknowledgment is sent to the packet-routing component at least once during the registration lifetime. As such, if the lifetime value is sixty minutes, a binding update and binding acknowledgment are sent between the packet-routing component 312 and the allocation component 314 at least in that sixty minute period. As mentioned, the lifetime value is communicated to the packet-routing component 312 in the binding acknowledgment sent from the allocation component. Each time the packet-routing component 312 receives the lifetime value, it determines whether it is the same as the previous value or whether it has changed. If it has changed, various steps similar to those illustrated in FIG. 3, beginning with step 338, are performed so that new values can be set in the inactivity timer and communicated to the mobile device. If, however, the value has not changed, data continues to be exchanged, shown by numeral 352. In either case, the mobile device 310 may keep the same IP address since the IP communication session has not been terminated.

As embodiments of the present invention provide for the mobile device receiving an inactivity timer or some other indication as to a registration lifetime, the mobile device is now aware when an IP communication session is to expire. In one embodiment, the mobile device loses coverage as it is in an area without coverage. Now, the mobile device will know that the IP communication session is still alive even though the mobile device is out of coverage. It will know that, until expiration of the inactivity timer, the mobile device is continuing its IP communication session so that when the mobile device returns to an area with coverage, the mobile device will not need to request a new IP address. If the inactivity timer expires prior to the mobile device returning to an area with coverage of if the mobile device knows it will not need an IP address after expiration of the timer, the IP communication session would be allowed to expire. The mobile device is also able to renew its registration prior to expiration of the inactivity timer, as the mobile device is now aware when the session expires. When a session is renewed, the first steps illustrated in FIG. 3 may not need to be performed again. Instead, the necessary renewal steps may begin with a configuration request 346 sent 344 from the mobile device 310 to the packet-routing component 312.

Figure 4:
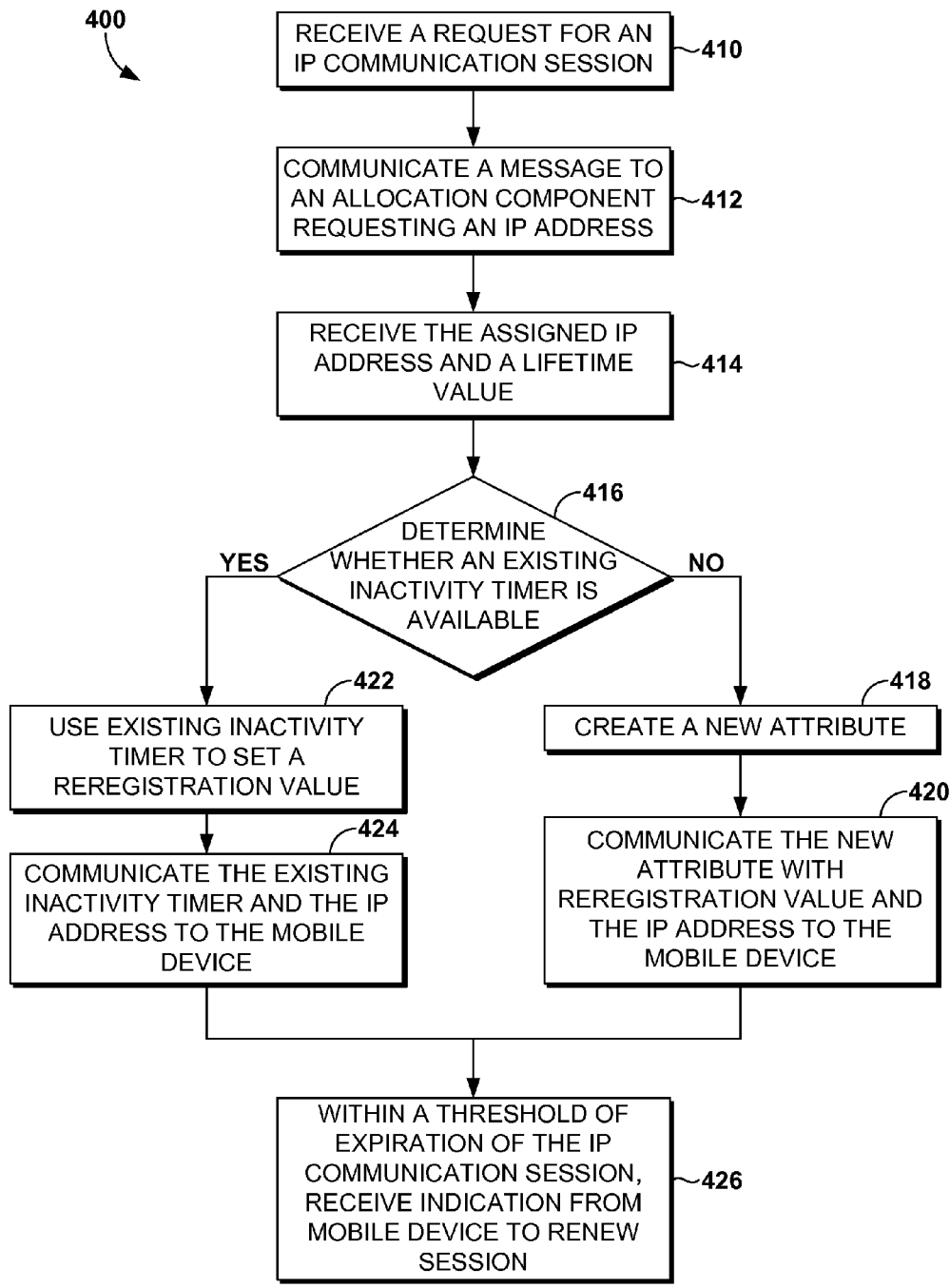
FIG. 4 depicts a flowchart illustrating a method for communicating an inactivity timer to a mobile device, in accordance with an embodiment of the present invention.

FIG. 4 depicts a flowchart illustrating a method 400 for communicating an inactivity timer to a mobile device, in accordance with an embodiment of the present invention. Initially, a request is received for an IP communication session at step 410. An IP address, which may be either IPv4 or IPv6, may be used to establish an IP communication session between the mobile device and a wireless communications network. The mobile device is authenticated on the wireless communications network, which includes the exchange of various messages between the mobile device and various network components. As a part of the authentication process or after the mobile device is authenticated, a message is communicated to an allocation component requesting an IP address for the mobile device. This is shown at step 412. This message, in one embodiment, is in the form of a binding update. In one embodiment, the allocation component is a home agent, but in another embodiment, it is an LMA. The allocation component then assigns an IP address to the mobile device and determines a lifetime value. The lifetime value indicates a length of time after which the IP communication session associated with the mobile device is set to expire unless an action is taken prior to the expiration. This information is received by a packet-routing component at step 414. In one embodiment, the packet-routing component is a PDSN, but in another embodiment, it is a MAG.

At step 416, it is determined whether an existing inactivity timer is available. In one embodiment, an existing timer is an NCP inactivity timer used for the network layer. If an existing timer is not available, a new attribute is created at step 418 so that it can be sent to the mobile device. At step 420, a message is communicated to the mobile device. Here, the message includes the assigned IP address and the new attribute that comprises a reregistration value calculated from the lifetime timer. The reregistration value, as previously mentioned, allows the mobile device to reregister the IP communication session when the session has expired. It also allows the mobile device to renew the current IP communication session prior to expiration of the session.

If, however, it is determined at step 416 that an existing inactivity timer is available, the existing inactivity timer is used to set a lifetime value, shown at step 422. In one embodiment, setting a lifetime value comprises determining a threshold value that may be subtracted from the lifetime value to determine a reregistration value. The threshold value indicates an amount of time prior to the expiration of the session that the session should be renewed. This may include reminding the mobile device that the session is close to expiration. At step 424, the existing inactivity timer is communicated to the mobile device. Once the mobile device is aware of the reregistration value after which the IP communication session is to expire, it can provide an indication to the network, such as the packet-routing component, that it would like to renew the session. This indication may be provided prior to the expiration of the inactivity timer, shown at step 426. The indication, in one embodiment, is a transfer of data to the network. In an alternative embodiment, the indication is a message to the network that the session should be renewed.

In one embodiment, the packet-routing component communicates a binding update to the allocation component and the allocation component communicates a binding acknowledgment to the packet-routing component once during each reregistration cycle. As such, if the reregistration value set in the activity timer is sixty minutes, a binding update and binding acknowledgment are both sent at least once during this sixty-minute time period. The lifetime value may change in some instances. If it does change, a new reregistration value is calculated based on the new lifetime value and the threshold value. This new reregistration value is communicated to the mobile device.

Figure 5:
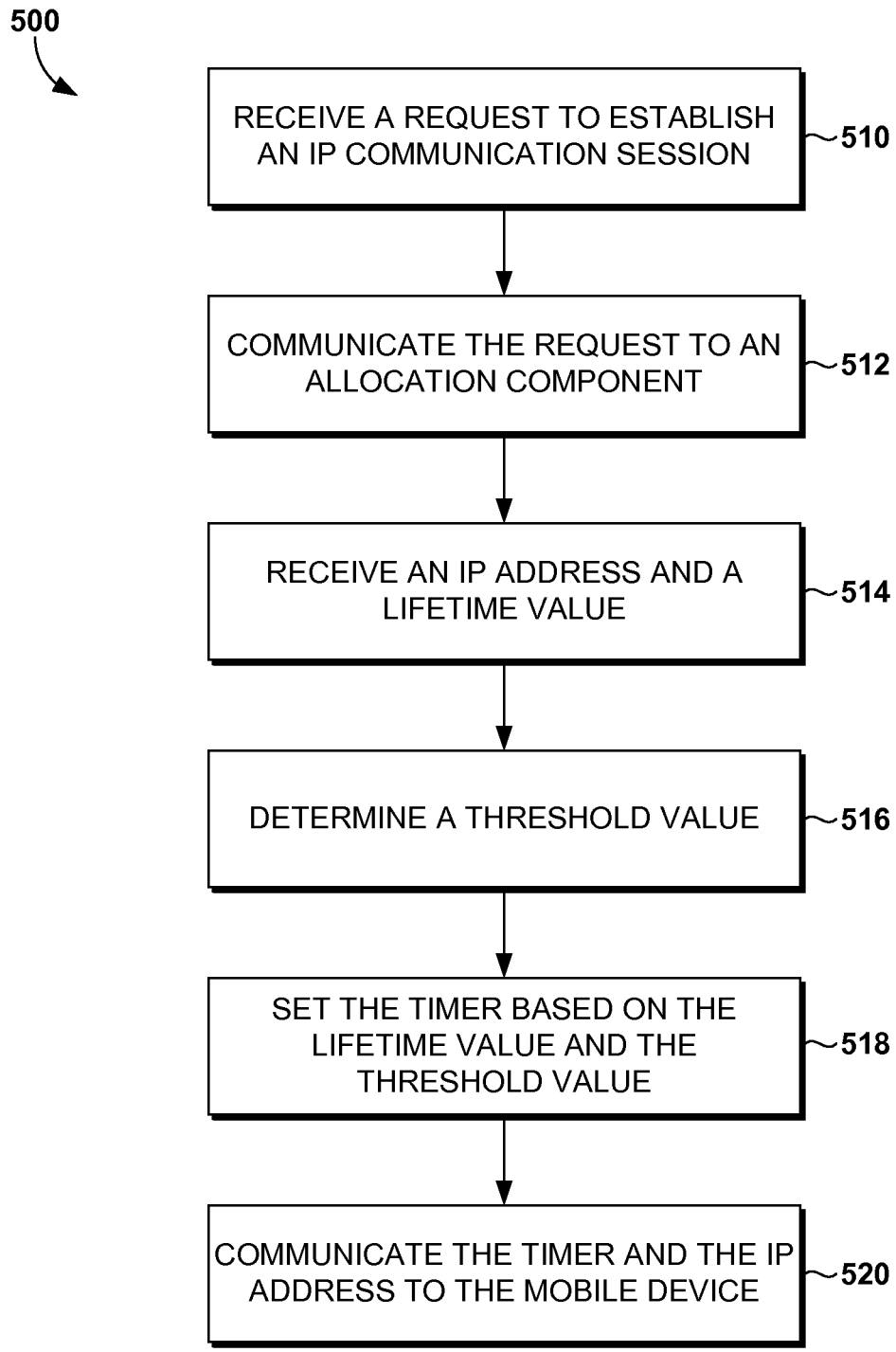
FIG. 5 depicts a flowchart illustrating another method for calculating an inactivity timer to send to a mobile device, in accordance with an embodiment of the present invention.

Referring to FIG. 5, a flowchart is shown illustrating another method 500 for calculating an inactivity timer to send to a mobile device, in accordance with an embodiment of the present invention. Initially, a request is received at step 510 to establish an IP communication session. This would allow the mobile device to communicate with a wireless communication network. Generally, an IP communication session, as used herein, initiates when a mobile device is assigned an IP address, which may be either an IPv4 or IPv6 address, depending on the network, mobile device, etc. An IP communication session allows the mobile device to communicate data with the network, which may include communications over the Internet, or with another mobile device or other types of devices. At step 512, the request is communicated to an allocation component, such as a home agent or an LMA. In one embodiment, the request is communicated to the allocation in the form of a binding update. The binding update generally communicates several types of information to the allocation component. In one embodiment, the binding update message is a PMIPv6 binding update message. Here, a flag may be used to indicate that the binding update message is a PMIPv6 binding update message. In addition to an indication that the mobile device does not currently have an assigned IP address, such as the home network prefix extension being set to zero (e.g., Address=0), the binding update may also include a network access identifier (NAI) extension associated with the mobile device so that the allocation component knows which mobile device is requesting the IP address. Wireless communications networks typically contain multiple allocation components (e.g., home agents or LMAs), and as such the packet-routing component, prior to communicating the binding update, may determine which allocation component is associated with the mobile device.

At step 514, an IP address and a lifetime value are received after the IP address is assigned to the mobile device by the allocation component. In one instance, the IP address received from the allocation component is a prefix portion of the IP address. In one embodiment, this data is received from the allocation component and may be communicated in the form of a binding acknowledgment, which is a response to the binding update. The binding acknowledgment may be a PMIPv6 binding acknowledgment message. The allocation component, in addition to assigning the IP address to the mobile device, also ensures that the prefix portion of the IP address is unique, and it controls the routing and filter table with 64 bits of the prefix Like the binding update, a flag may be set indicating that it is a PMIPv6 binding acknowledgment. Additionally, the allocation component may send a message to an authentication component (e.g., AAA) indicating the allocation component's address. This information may be stored at the authentication component. Now that the packet-routing component has the lifetime value, which indicates a length of time after which the IP communication session expires, a threshold value is determined at step 516. The threshold value indicates the length of time prior to the expiration of the IP communication session at which reregistration of the IP communication session with the wireless communications network is to occur. The threshold value may be a predetermined value that is stored in a database such that the packet-routing component accesses the database to determine the threshold value. Or, the threshold value may be determined based on device-specific factors.

A lifetime timer may now be set at step 518 based on the lifetime value and the threshold value. In one embodiment, the lifetime timer is already in existence so that it does not have to be created or generated. Further, the lifetime timer, if existing, may be associated with the network layer of the IP communication session. The timer may be an NCP inactivity timer. This timer may be used so that it is not necessary to create a new timer. The registration lifetime value that is determined based on the lifetime value and the threshold value may be equal to or less than the lifetime value less the threshold value. In some instances, if the lifetime value is sixty minutes and the threshold value is two minutes, the registration lifetime value may be fifty-eight minutes or less. How much less than fifty-eight minutes is implementation specific and may be modified. At step 520, the lifetime time and the assigned IP address are communicated to the mobile device. Now, the mobile device is aware of the expiration of the IP communication session so that when using various applications, the mobile device knows to renew a session if the application is currently being used. Once the mobile device has its assigned IP address, data packets can be sent between the mobile device and, for example, the Internet by way of the wireless communications network.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for communicating a reregistration value for proxy mobile IP (PMIP) communication sessions to a mobile device, the method comprising:
   receiving a request for an Internet Protocol (IP) address that is used to establish an IP communication session between a particular mobile device and a wireless communications network, wherein the IP communication session is established as a PMIP communication session;
   authenticating the mobile device to the wireless communications network, the authenticating comprising,
   A) communicating a message to an allocation component, comprising a local mobility anchor which supports PMIP access, indicating that the mobile device is requesting establishment of the IP communication session, thus indicating that the mobile device does not currently have an assigned IP address, and
   B) receiving, from the allocation component, the assigned IP address for the mobile device and a lifetime value indicating a length of time after which the PMIP communication session between the mobile device and the wireless communications network expires;
   computing a reregistration value, wherein computing the reregistration value comprises
   A) determining a threshold value which indicates an amount of time prior to expiration of the lifetime value,
   B) calculating a difference between the lifetime value and the threshold value, and
   C) setting the reregistration value to a value less than or equal to the calculated difference between the registration lifetime and the threshold value;

creating a new attribute that comprises the reregistration value to communicate to the mobile device; and communicating a message to the mobile device, the message including the assigned IP address and the reregistration value, wherein the reregistration value indicates a time prior to expiration of the PMIP communication session, wherein the reregistration value allows the mobile device to reregister the PMIP communication session when the PMIP communication session has expired or renew the current PMIP communication session prior to the expiration of the PMIP communication session.

2. The computer-readable media of claim 1, further comprising determining that the mobile device is outside a coverage area associated with the wireless communications network.

3. The computer-readable media of claim 2, further comprising receiving a reconfiguration request from the mobile device to reestablish the IP communication session.

4. The computer-readable media of claim 1, further comprising, based on the lifetime timer, determining that the IP communication session is close to expiration.

5. The computer-readable media of claim 4, further comprising renewing the current IP communication session, thus allowing the mobile device to keep the IP address.

6. The computer-readable media of claim 1, wherein the message is a binding update message.

7. The computer-readable media of claim 1, further comprising receiving an address associated with the allocation component from the allocation component.

8. Computer-readable media having computer-executable instructions embodied thereon that, when executed, facilitate a method for communicating a lifetime timer for proxy mobile Internet Protocol (PMIP) communication sessions to a mobile device, the method comprising:
    receiving a request from the mobile device to establish an Internet Protocol (IP) communication session, thus allowing the mobile device to communicate with a wireless communications network, the request indicating that the mobile device does not currently have an assigned IP address;
    communicating the request to an allocation component in the form of a PMIP binding update;
    receiving from the allocation component an IP address that has been assigned to the mobile device for a PMIP communication session associated with the mobile device and a lifetime value indicating a length of time after which the PMIP communication session associated with the mobile device expires;
    determining a threshold value that indicates the length of time prior to expiration of the PMIP communication session at which reregistration of the PMIP communication session with the wireless communications network is to occur;
    setting a lifetime timer value associated with the PMIP communication session based on the lifetime value and the threshold value; and
    communicating the lifetime timer value associated with the PMIP communication session, and the assigned IP address to the mobile device in a single message so that the mobile device is aware of an expiration of the PMIP communication session.

9. The computer-readable media of claim 8, wherein the IP address is an IP version 4 (IPv4) address.

10. The computer-readable media of claim 8, wherein the assigned IP address is the network portion of the IP address.

11. The computer-readable media of claim 8, wherein the lifetime timer is a Network Control Protocol (NCP) inactivity timer.

12. The computer-readable media of claim 8, wherein the existing lifetime timer is set to a reregistration value.

13. The computer-readable media of claim 12, wherein the reregistration value is equal to or less than the lifetime value less the threshold value.

14. The computer-readable media of claim 8, further comprising:
    prior to expiration of the existing lifetime timer, receiving an indication from the mobile device to renew the PMIP communication session; and
    renewing the PMIP communication session by,
        A) receiving a configuration request from the mobile device, the configuration request including the IP address, and
        B) communicating a configuration acknowledgment that includes the IP address.

15. The computer-readable media of claim 8, further comprising:
    communicating a second binding update to the allocation component; and
    receiving from the allocation component a different lifetime value.

16. The computer-readable media of claim 15, further comprising:
    calculating a new value to the existing lifetime timer; and
    communicating the existing lifetime timer with the new value to the mobile device.

17. Computer-readable media having computer-executable instructions embodied thereon that, when executed, facilitate a method for communicating an existing inactivity timer to a mobile device, the method comprising:
    authenticating the mobile device on a wireless communications network, thus enabling the mobile device to communicate data with the wireless communications network;
    establishing a proxy mobile Internet Protocol (PMIP) communication session for the mobile device, comprising assigning an IP address for the PMIP communication session and determining a lifetime value corresponding to an amount of time after which the PMIP communication session with the wireless communications network expires;
    utilizing an existing timer associated with a network layer of the PMIP communication session to represent the lifetime value corresponding to the amount of time after which the PMIP communication session with the wireless communications network expires;
    communicating the existing timer, comprising the lifetime value corresponding to the amount of time after which the PMIP communication session expires, and the assigned IP address to the mobile device in a single message; and
    within a predetermined threshold of time prior to expiration of the PMIP communication session, receiving an indication from the mobile device to prevent the PMIP communication session from expiring, the expiration of the PMIP communication session terminating an ability of the mobile device to communicate the data with the wireless communications network.

18. The computer-readable media of claim 17, wherein the existing inactivity timer is a Network Control Protocol (NCP) inactivity timer associated with the network layer.

19. The computer-readable media of claim 17, further comprising setting an actual lifetime value to a value less than the value of an initial lifetime value less the threshold value.

20. The computer-readable media of claim 17, wherein the indication from the mobile device is a transfer of data.

* * * * *